April 13, 1926.
M. C. OVERMAN
1,581,087
TIRE SECURING DEVICE
Filed Dec. 27, 1921
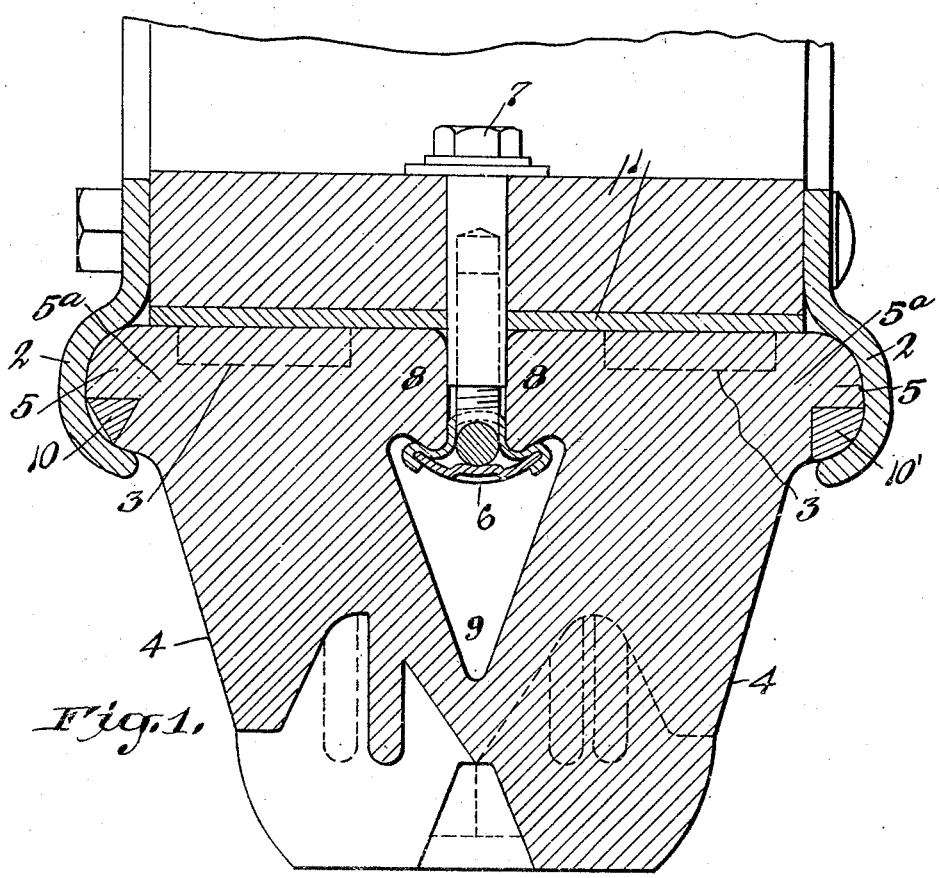

Patented Apr. 13, 1926.

1,581,087

UNITED STATES PATENT OFFICE.

MAX CYRUS OVERMAN, OF NEW YORK, N. Y., ASSIGNOR TO O. & W. COMPANY, A CORPORATION OF NEW YORK.

TIRE-SECURING DEVICE.

Application filed December 27, 1921. Serial No. 525,045.

*To all whom it may concern:*

Be it known that I, MAX CYRUS OVERMAN, a citizen of the United States of America, residing at New York, N. Y., have invented certain new and useful Improvements in Tire-Securing Devices, of which the following is a specification.

My present invention relates to tire securing devices and more particularly to means for preventing the base beads of the tire from pulling away from the flanges of the wheel or felloe.

The drawings purport to show only some of the preferred forms or embodiments which my improvements are adapted to take.

In them, Fig. 1 is a cross-sectional view of a flanged felloe and cushion tire with securing means within my present invention applied thereto; and Figs. 2, 3 and 4 show three preferred forms of cross-section for the securing rings.

1 is the felloe, 2—2 are flanges bolted to the felloe, 3—3 are rectangular projections on the felloe spaced apart in two series circumferentially around the felloe.

4 is a cushion tire of the Overman type but which may be of any other type, having beads 5—5 at the sides of its base adapted to be engaged by the flanges.

The tire will ordinarily have its base attached or secured to the felloe (this term being used throughout to designate either the felloe or the felloe-band or both) by some sort of means. That illustrated is of a usual Overman type comprising a circumferential series of clamping plates 6, only one of which is shown in the accompanying cross-sectional drawing. These plates 6 are adjustably secured to the felloe by bolt means 7 located in a vertical slot through the base of the tire, with the clamping plates engaging the portions 8—8 of the tire-base that overlie the hollow 9 of the tire.

The base of the tire is formed with properly sized and spaced rectangular recesses to receive the above referred to projections 3 as is usual in the Overman construction of tire and felloe.

The above sufficing for a general description of the pertinent features shown in the drawing, I will now describe my present improvement which comprises a ring 10, preferably metal, set into a circumferential recess in each bead at its flange 2 towards the free edge thereof.

These rings are or may be inserted into the bead recesses before bolting the flanges against the beads, said rings thereupon being clamped into the beads and in turn preventing the beads from being pulled out of the flange space. It will be seen that in the tire illustrated, the rings are confined both radially and laterally by the flanges.

To this end, the inside of each ring is preferably flat, in transverse direction. However, the rings may have a variety of cross-sections of which three preferred forms are shown in the drawings. See especially Figs. 2, 3 and 4, and compare them with Fig. 1, wherein the ring 10 of Fig. 2 is shown at the left side of the figure and the ring 10' of Fig. 3 is shown at the left.

The rings 10, 10' and 10² are especially effective when used in combination with a felloe having projections received into the recessed base of the tire where the projections are located relatively to the rings so that between them each bead has a constricted neck 5ª. The rest of the bead being too large to be pulled through said constricted space, it follows that nothing short of disrupting the tire can or will pull the beads away from the flanges.

It is possible that changes and modifications may be made in the foregoing which will nevertheless still be within the spirit of the foregoing disclosure and within the meaning and spirit of the annexed claims, and which as such are accordingly intended to be covered hereby.

What I claim is:

1. In combination, a tire having a recessed base and a circumferentially recessed bead, a felloe with projections fitting the recessed base, a demountable retaining flange for the bead, said flange being laterally attachable to said felloe and a laterally applied ring recessed into said bead at the flange towards its free edge, said projections on the felloe being located relatively to the recessed ring so that between them the bead has a constricted neck.

2. In combination, a tire having a recessed base and circumferentially recessed beads at the sides of said base, a felloe with projections fitting the recessed base, retaining flanges for said beads, and rings in the circumferential recesses of the beads at the flanges towards their free edges, said projections on the felloe being located relatively to the recessed rings so that between them each bead has a constricted neck.

3. In combination, a tire having a laterally extending base bead, the circumferential inner portion of said bead being solid and its circumferential outer portion being recessed, a substantially rigid member in said recess of the bead; a felloe; and a demountable flange laterally attachable to said felloe which flange when in place is in lateral contact with said solid inner portion of the bead and is also in contact with said rigid member so as to confine same both radially and laterally.

4. In combination, a tire having a laterally extending base bead, a flange adapted to confine said bead, the circumferential inner portion of said bead being solid and its circumferential outer portion being recessed, and a substantially rigid member in said recess radially and laterally confined by said flange, the inner periphery of said member being substantially flat in transverse section, as is also the face of the recess with which it contacts.

5. In combination, a tire having a recessed base and a laterally extending base bead, a felloe with a projection fitting said recessed base, a flange adapted to confine said bead, the circumferential inner portion of said bead being solid and its circumferential outer portion being recessed, and a substantially rigid member in said recess confined by said flange, the aforesaid projection on said felloe being located relatively to said recessed rigid member so that between them the bead has a constricted neck.

6. In combination, a tire having a recessed base and a circumferentially recessed bead, a felloe with a projection fitting the recessed base, a retaining flange for the bead, a substantially rigid member recessed into said bead at the flange toward its free edge, said projection on the felloe being located relatively to said recessed member so that between them the bead has a constricted neck.

7. In combination, a tire having a rubber base bead extending laterally beyond the base of the tire, a securing flange formed to closely fit the contour of and laterally confine the said bead, said bead having a recess in its circumferential outer face, and a substantially rigid member seated in said recess with a portion of its surface exposed to and engaged by the said securing flange.

In testimony whereof, I have signed my name to this specification this 23rd day of December, 1921.

MAX CYRUS OVERMAN.